Nov. 5, 1968  L. O. HAYDEN  3,409,895

TIME RECORDING SYSTEM

Filed Dec. 6, 1966  7 Sheets-Sheet 2

INVENTOR
LEONARD O. HAYDEN

BY *Kenneth E. Jacobs* AGENT
*R. Strausser* ATTORNEY

Nov. 5, 1968  L. O. HAYDEN  3,409,895
TIME RECORDING SYSTEM
Filed Dec. 6, 1966  7 Sheets-Sheet 4

INVENTOR
*LEONARD O. HAYDEN*

BY *Kenneth E. Jacobs* AGENT

*R. Muravio* ATTORNEY

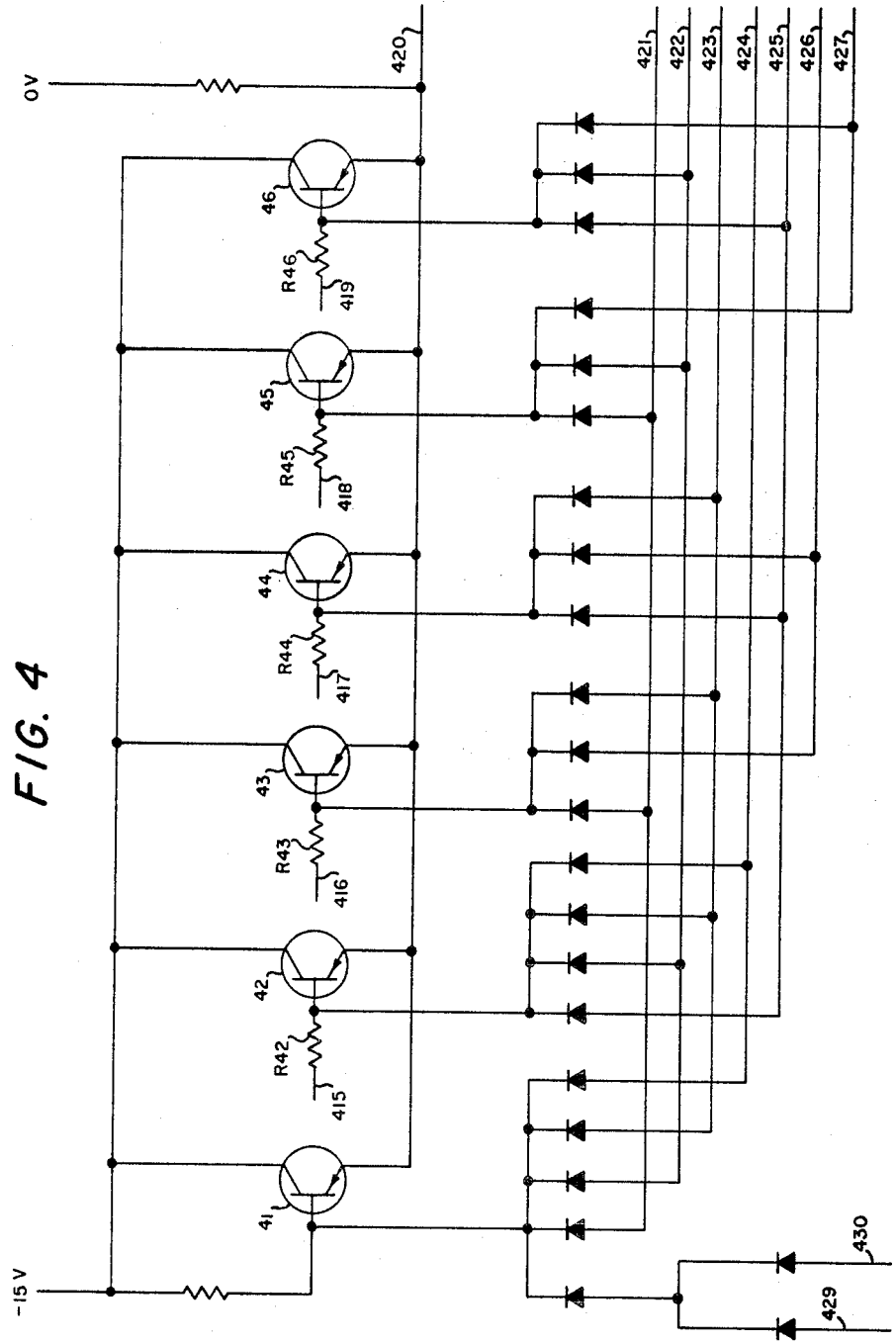

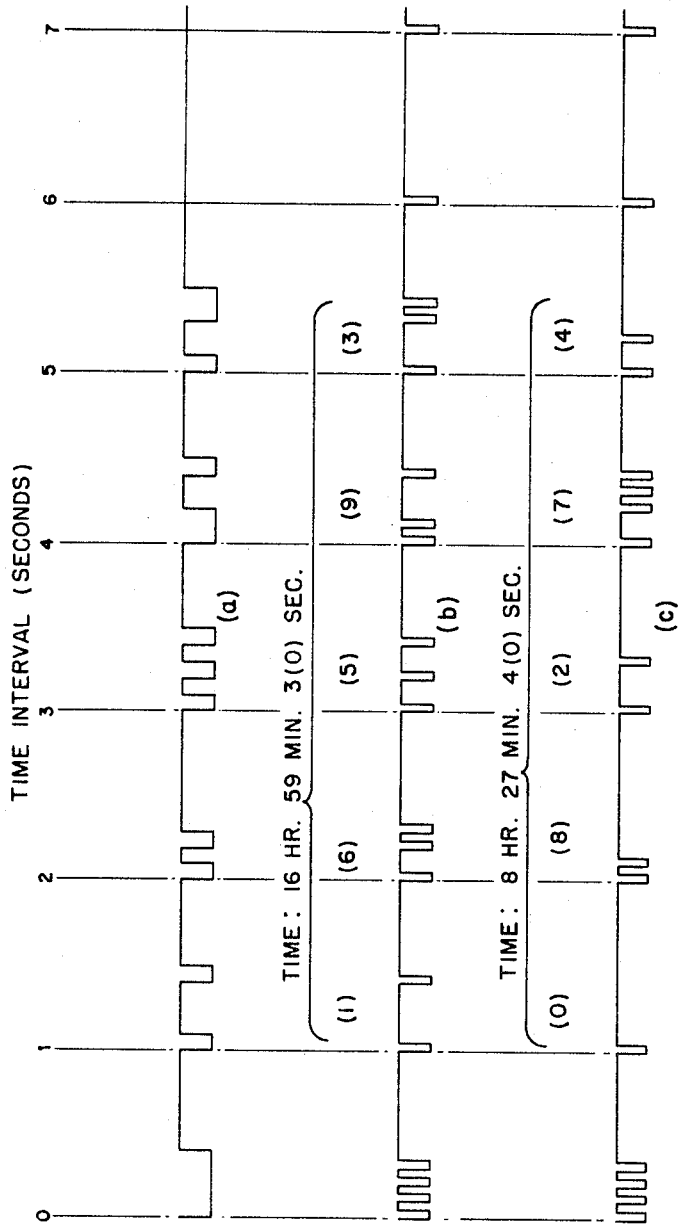

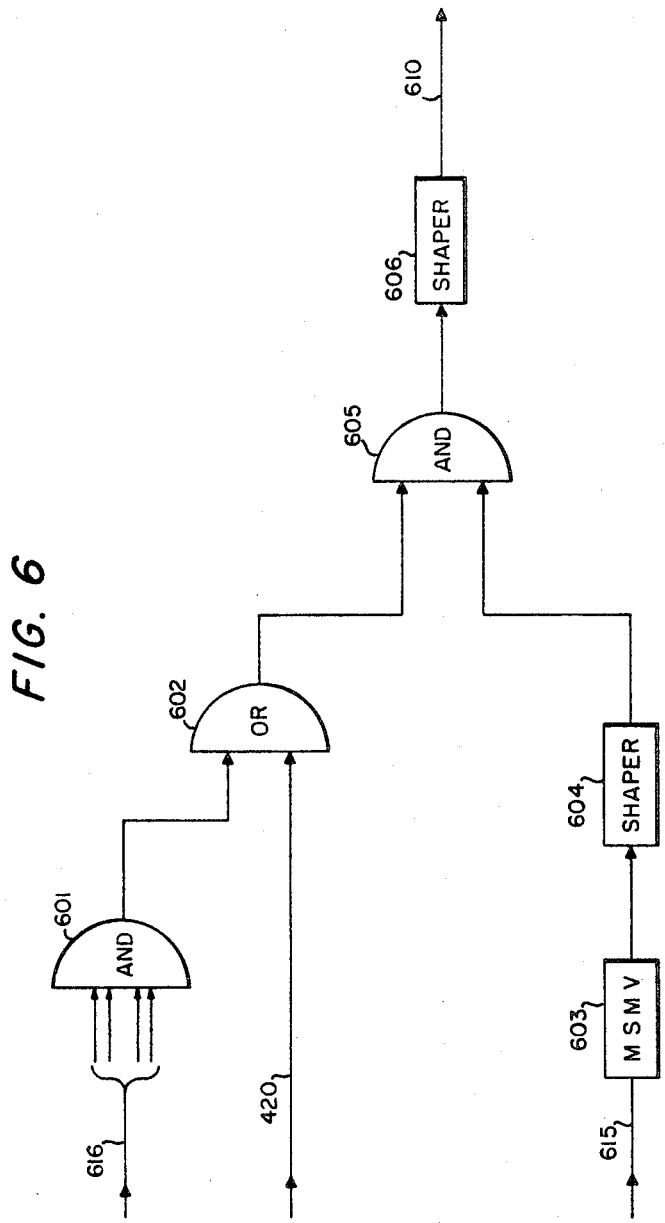

United States Patent Office 3,409,895
Patented Nov. 5, 1968

3,409,895
TIME RECORDING SYSTEM
Leonard O. Hayden, Accokeek, Md., assignor to the United States of America as represented by the Secretary of the Navy
Filed Dec. 6, 1966, Ser. No. 600,000
8 Claims. (Cl. 346—20)

ABSTRACT OF THE DISCLOSURE

A system for visibly recording time along a single track of a multichannel recorder. The time in hours, minutes, seconds and fractions thereof is recorded as a series of binary-coded decimal digits indicated by deflections of a single trace on a multichannel record medium. The digits recorded are generated by a system of counters and gating means which accept uniformly spaced timing pulses and produce serial binary-coded decimal digits. Each decimal digit is indicated by a reference marker and a plurality of binary value markers spaced at predetermined intervals thereafter.

---

The invention described herein may be manufactured and used by or for the Government of the United States of America for governmental purposes without the payment of any royalties thereon or therefor.

BACKGROUND OF THE INVENTION

The present invention relates in general to a system for recording time on a multichannel recorder and in particular to a system for recording binary-coded time signals with a single marker pen along one channel of the recording.

In space surveillance work, using continuously running multichannel recorders, the practice has been to record time with a marker pen along one margin of the recording. A readout at 10-second intervals gave time in five decimal digits. The digits were spaced at one second intervals with each decimal digit indicated by one to ten marks occurring at the rate of ten marks per second. In order to read the resulting record it was necessary to count the individual, closely spaced marks and this procedure was both time consuming and error inviting. The difficulty became even greater if the recording was made on a sheet moving at a slow rate (for example 5 mm./sec.).

SUMMARY OF THE INVENTION

The general purpose of this invention is to provide a time recording system which embraces all the advantages of prior art systems and avoids the aforedescribed disadvantage. To attain this the present invention contemplates the use of a plurality of counters and gating circuits to accept timing pulses and produce serial binary-coded signals for recording on a single channel.

Each binary-coded decimal digit is indicated by a reference marker followed by a plurality of binary value markers spaced at predetermined intervals after said reference marker so that a person can easily learn to read each decimal digit at a glance without individually counting the markers.

An object of the invention is the provision of a system for producing serial time records which can be easily and quickly read even when the recording is made along a limited length of a slow moving tape.

Another object is the provision of a time record the form of whose digits may be easily memorized and quickly distinguished.

Yet another object of the invention is the use of binary logic instead of decimal logic to eliminate critical resistance values in the time coding circuitry.

A further object of the invention is to reduce the number of markings necessary for recording a time digit and thus require less recording space for each digit so that the individual digits may be adequately spaced from each other.

BRIEF DESCRIPTION OF THE DRAWINGS

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 4 is a circuit diagram of slow gate SG–1 shown in block form in FIG. 1;

FIG. 5a shows the waveform of a typical input to pulse generator PG–2 shown in FIG. 6;

FIGS. 5b and 5c show waveforms of typical outputs from pulse generator PG–2 shown in FIG. 6; and FIG. 6 is a diagram of output pulse generator PG–2 shown in block form in FIG. 1.

DESCRIPTION OF THE PREFERRED EMBODIMENT

Figure 1A:
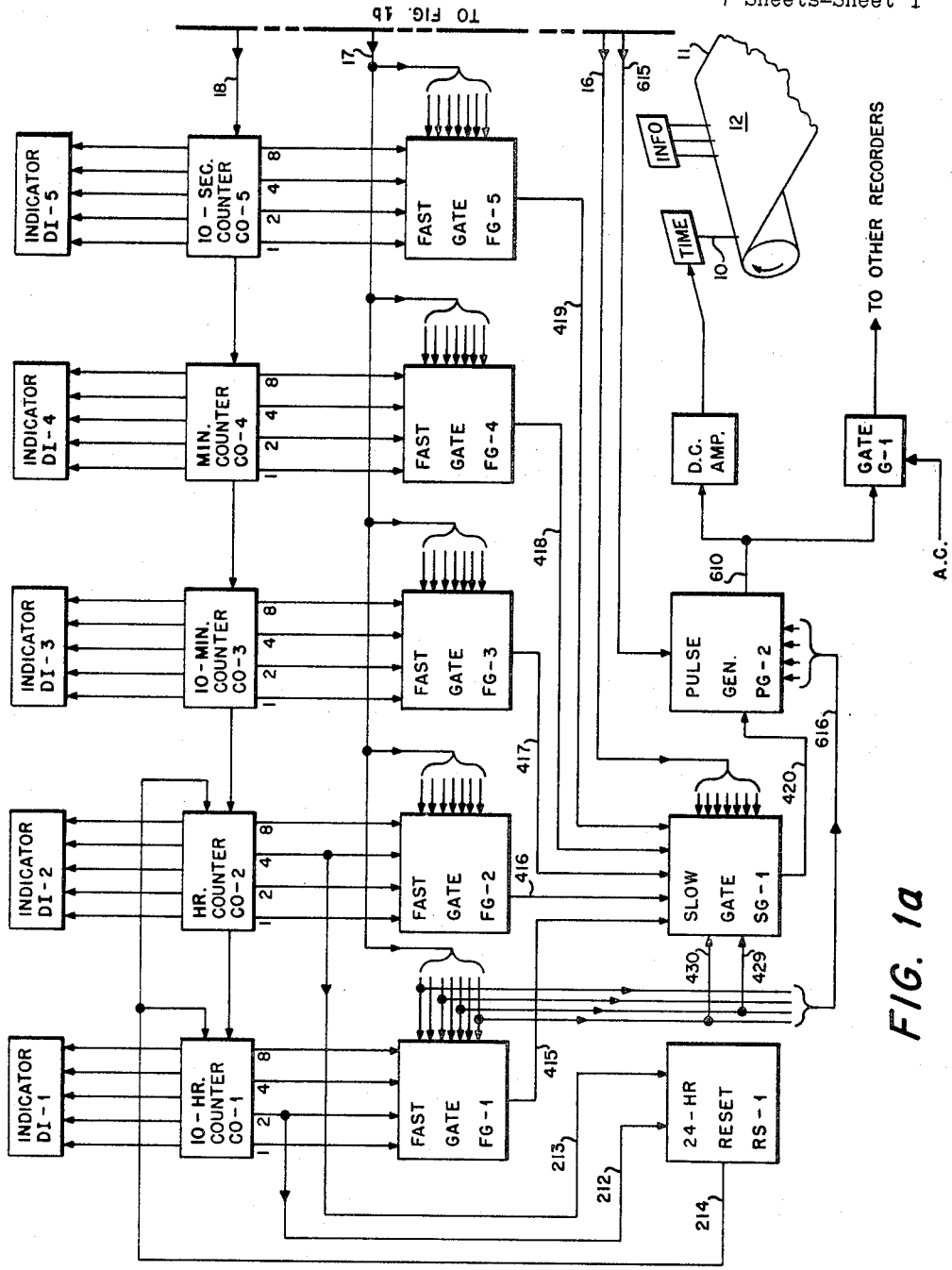
FIGS. 1a and 1b form a block diagram of a preferred embodiment of the time recording system of the present invention.
Figure 1B:
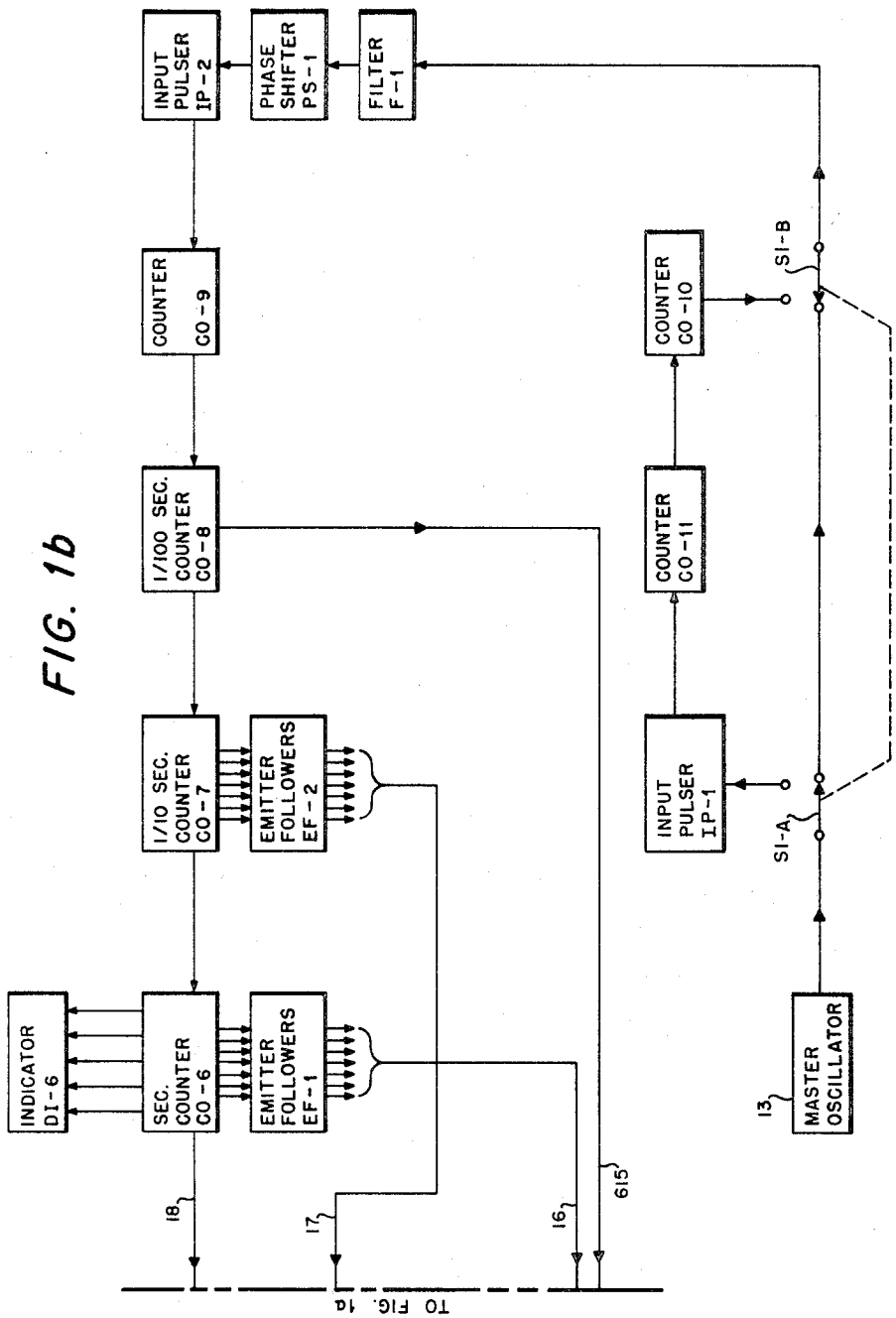

Referring now to the drawings, wherein like reference characters designate like or corresponding parts throughout, there is shown in FIGS. 1a and 1b a block diagram of the complete system. Depending upon what is available at the recording station, a 1 kc. or 100 kc. signal is by master oscillator 13 and introduced into the system. If 1 kc. pulses are used switch S1–A, B is placed in the position shown in FIG. 1b, and if 100 kc. pulses are used the switch is moved to its other position. In either case a 1 kc. signal, which is made sinusoidal by appropriate filtering, is applied to phase shifter PS–1. This phase shifter may for example be of the resolver type such as is shown on p. 498 of Waveforms, by B. Chance et al., McGraw-Hill Book Co., 1949. By using this resolver the phase of the sine wave can be continuously shifted to synchronize the timing signals with any desired time standard (usually universal time). The output of phase shifter PS–1 is introduced into input pulser IP–2 which converts the sine wave into a succession of triggering pulses to drive decade counter CO–9. The counter CO–9 drives CO–8 and so on to the last counter CO–1. All these counters are decade dividers except CO–3 and CO–5 which divide by six. Together they maintain a count of input pulses in terms of hours, minutes, seconds, and decimal fractions of a second in binary format. Decimal indicators DI–1 to DI–6 are coupled to the corresponding decade counters CO–1 to CO–6 to give a visual display of time.

The counts stored in counters CO–1 to CO–5 are gated by fast gates FG–1 through FG–5 which are controlled by the count on one-tenth second counter CO–7. Gate control connections to the five fast gates are in parallel and, consequently, each gate passes the signals from one of its input lines to its output line simultaneously with all the other fast gates.

The five simultaneous outputs of the five fast gates are coupled to the slow gate SG–1 on input lines 415, 416, 417, 418 and 419. The slow gate is switched by the signals derived from one second counter CO–6, and it can be seen that the slow gate switches only one-tenth as fast as the fast gates.

In normal operation, once each ten seconds, the four binary signals from counter CO–1 pass serially through fast gate FG–1, line 415, slow gate SG–1 to line 420 during a one second interval. Then the binary signals from counter CO–2 are passed in a similar manner to line 420 during the succeeding one second interval. Binary signals from counters CO–3, CO–4 and CO–5 follow in their turn so that every ten seconds a complete serial readout of the five counters is obtained.

The complete time information contained in the output on line 420 of the slow gate is shown in FIG. 5a. Each negative pulse has a 0.1-sec. duration so that pulses in adjacent positions join together. Further, no pulses appear between 6 to 9 seconds in each 10-sec. interval. It is desirable to have pips to indicate the beginning of each second and to have gaps between the pulses. To obtain this the output pulse generator PG–2 inserts the desired pulses during the first tenth second of the 6th through 9th seconds and also shortens the 0.1-sec. pulses to 40 msec. so that adjacent pulses are separated by 60 msec. It also adds a four-pip marker at the beginning of each 10-second period. A typical output from pulse generator PG–2 is shown in FIG. 5b.

The output of pulse generator PG–2 may be recorded directly on a recorder which accepts a DC input for pen deflections or it may be used to drive several recorders in which case a power amplifier is added after PG–2 to supply sufficient power and increased voltage.

For A.C. operated recording mechanisms, gate G–1 is added. This gate is controlled by the signals from pulse generator PG–2 to pass through A.C. signals to deflect marker pen 10 on the time channel of a moving paper tape 11.

If a recorder accepting D.C. pulses is used the final recording will appear essentially the same as the waveform shown in FIG. 5b. On the other hand if the recorder accepts A.C. signals each rectangular pulse would be replaced by short burst of A.C. signals.

FIG. 5b shows decimal digits 1, 6, 5, 9, and 3 giving a reading of 16 hours, 59 minutes, and 30 seconds. The remaining decimal digits 0, 8, 2, 7, and 4 are shown in FIG. 5c. The first mark associated with each decimal digit is the 1-second marker and acts as a reference marker identifying the positions of any following binary value markers. The other markers, if they occur, follow at 0.1, 0.2, 0.3, and 0.4 second after the reference marker and have values of 8, 4, 2 and 1, in that order, the sum being equal to the decimal digit which they represent. Lack of a pulse in any of the four binary positions indicates the binary value of zero. Memorizing the binary number system (although this is no special difficulty) is not necessary. A reader may simply memorize the form of the ten possible symbols which may appear for decimal numbers 0 to 9.

A detailed description of the circuitry and its operation will now be given. The Decade Counters CO–1, CO–2, CO–4, CO–6, CO–7, CO–8, CO–9, CO–10, CO–11 may be, for example, Beckman/Berkely Counting Units, Model 750–A. They accept the series of pulses and, using four binary stages, furnish a four bit binary representation of the count. When a count of ten is attained the decade counter is automatically reset to zero and a signal is transmitted to the next higher decade stage. Each of the counters may include reset and advance switches so that it may be manually reset to zero or advanced to any desired initial count.

The counters CO–3 and CO–5 may be of the same type as the other counters with modifications to obtain a division by six instead of the normal division by ten.

Decimal Count Indicators DI–1 through DI–6 may be Beckman/Berkely, Model 751–A indicators. These units are coupled to the binary stages of the decimal counters and give a visual reading of the count contained in the row of counters.

Figure 2:
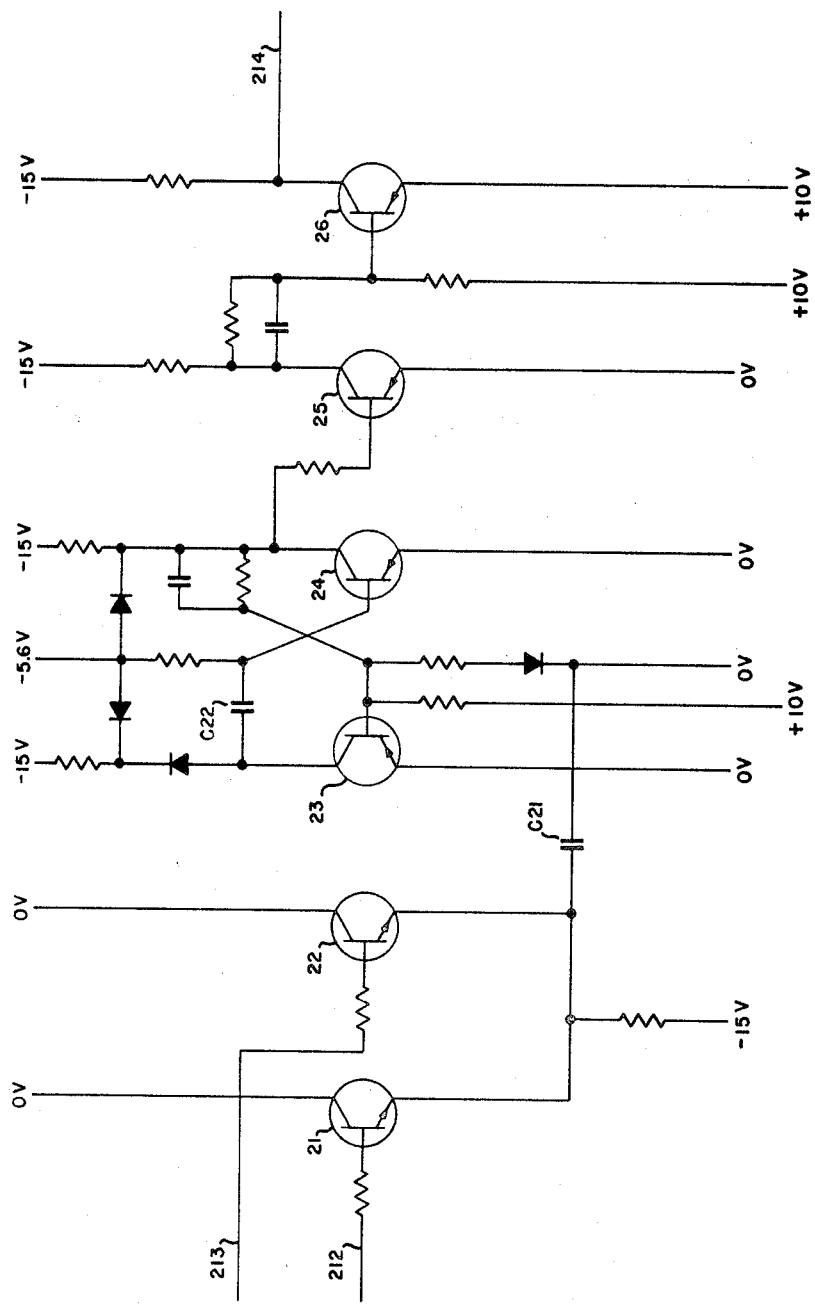
FIG. 2 is a circuit diagram of the 24-hour reset circuit RS–1 shown in block form in FIG. 1.

At the end of each 24 hours it is desired to reset the counters for the beginning of a new day. To do this the 2-line in 10-hour counter CO–1 and the 4-line in 1-hour counter CO–2 are connected via lines 212 and 213 to an "and" gate formed by transistors 21 and 22 in the 24-hour reset section shown in FIG. 2. (It should be mentioned here that the voltages shown on the drawing are exemplary only and may be different depending upon the details of the components used.) The output of this "and" circuit is coupled through capacitor C21 to a monostable multivibrator formed by transistors 23 and 24. A negative pulse is generated on the collector of transistor 24 for a period determined by the value of capacitor C22. This negative pulse produces a rise in the collector voltage of transistor 25. The base voltage of transistor 26 is adjusted slightly negative with respect to the emitter by means of a voltage divider. When a positive-going pulse is applied to its base, transistor 26 is cut off. This causes its collector voltage to fall a sufficient amount to reset counters CO–1 and CO–2 via line 214. In this way the counting starts from zero once every 24 hours and the time which is to be recorded is maintained continuously on counters CO–1 through CO–5.

In order to read these counters in the proper sequence a plurality of gating circuits is used. The four binary bits from each of the five counters CO–1 through CO–5 are coupled in parallel to five fast gates FG–1 through FG–5. The outputs of these five fast gates are similarly connected in parallel to slow gate SG–1. The slow gate is controlled by 1-sec. counter CO–6 and operates through a complete time recording cycle once every ten seconds. The slow gate divides the 10-second period into ten 1-second intervals and successively passes the outputs from the five fast gates, each during a predetermined 1-second interval.

A circuit diagram of the slow gate is shown in FIG. 4. The outputs from the five fast gates are connected via lines 415–419 to the bases of transistors 42–46 through resistors R42–R46. The gated output of the transistors appears on line 420. The transistors in the slow gate are controlled by the voltage levels derived from counter CO–6. Direct coupling of the multiple loads of the gating circuits to the decade counter would cause faulty functioning of the flip-flop circuits and, to avoid this, each of the lines from the counter are connected through emitter followers EF–1 for isolation. The parallel output lines 421–427 from the emitter followers are selectively connected through diodes to the bases of transistors 41–46 to clamp these bases to zero voltage except for the one second interval during which a given transistor is to be gated open. For example, it can be seen from FIG. 4 that transistor 42 will be in condition to pass a signal when lines 422, 423, 424 and 425 are at an appropriate negative potential. Likewise transistor 43 is gated by lines 421, 423, 426; transistor 44 by lines 423, 425, 426; transistor 45 by lines 421, 422, 427; and transistor 46 by lines 422, 425, 427. Each of these five transistors is in a signal passing state during a different one second interval in each ten second period.

Figure 3:
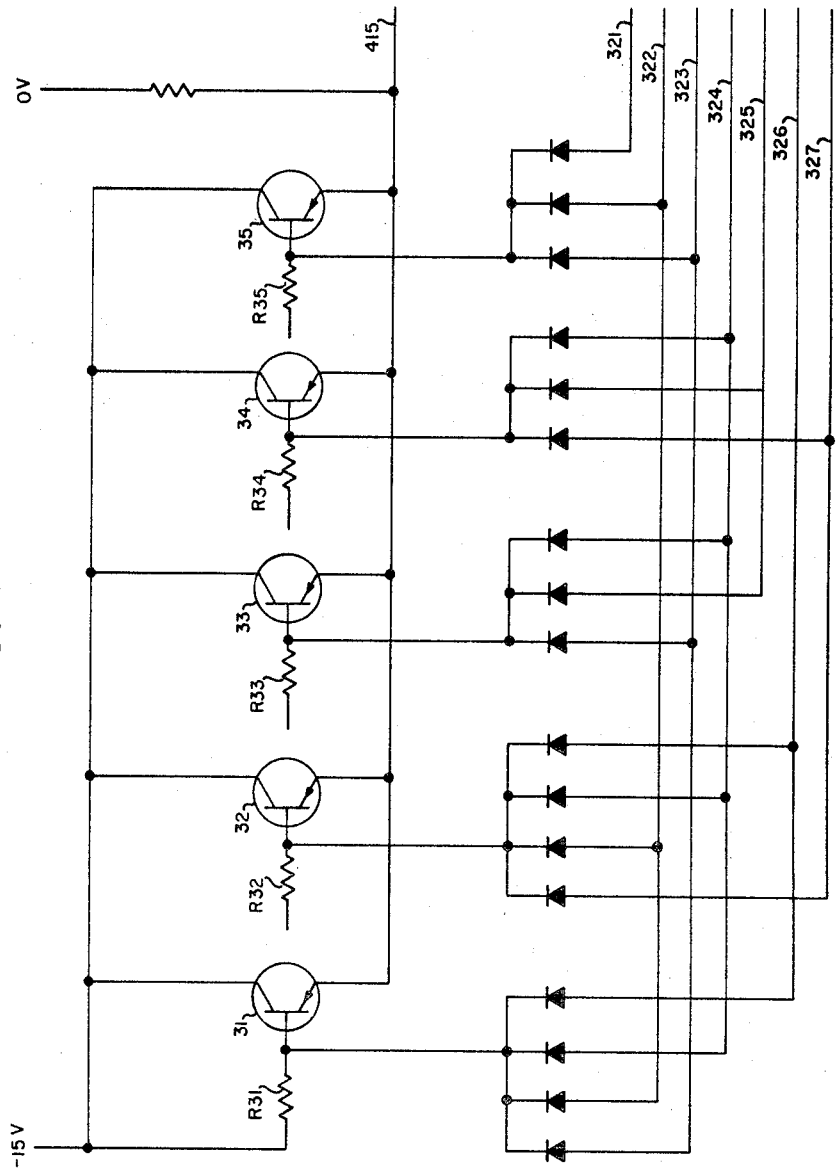
FIG. 3 is a circuit diagram of a fast gate shown in block form in FIG. 1.

The input lines 415–419 are connected individually to the outputs from fast gates FG–1 through FG–5. The behavior of each fast gate resembles that of the slow gate, but the gating rate is ten times per second instead of once per second. The outputs from the one-tenth second counter CO–7 are connected through emitter following EF–2 via diodes to the bases of the gating transistors in each of the fast gates. A typical fast gate, such as FG–1, is shown in FIG. 3. The four binary signals from the 10-hour counter CO–1 are connected to the bases of trasistors 32–35 through resistors R32–R35. Signals from 1/10 second counter CO–7 control these transistors via lines 321–327 so that they pass the binary signals sequentially to output line 415. Each of the fast gates acts simultaneously in a similar manner to present signals to slow gate SG–1; and the slow gate acts to pass sequentially first the 10-hour count, then the onehour count, then the 10-minute count, etc., until a complete time read-out is made. This time read-out is accomplished once every ten seconds.

The first one-second interval in each 10-second period is not used for digit read-out but is reserved for a four-pip marker so that the start of each time recording can be easily identified. In order to obtain this four-pip marker slow gate SG–1, in addition to being under the control of one-second counter CO–6, is also connected to one-tenth second counter CO–7 via lines 429–430. During the first 0.4 second of each second, lines 429 and 430 are negative, and during the first one second of each ten seconds, lines 421, 422, 423, and 424 are also negative. This produces a 0.4-sec. negative output from transistor 41 in the slow gate once every ten second period.

The output pulses from the slow gate contain the complete time code information in the form shown in FIG. 5(a). Before recording this information it is desired to have reference markers appear each second and to break up the long pulses into two or more short pulses as shown in FIG. 5(b). This function is performed by the output pulse generator PG–2 shown in FIG. 6.

The reference marker pulses are obtained by an "and" gate 601 which may for example be built from four transistors. The four inputs to this "and" gate are derived through emitter followers from one-tenth second counter CO–7 and the only time these four inputs are all negative is for a tenth of a second at the beginning of each one second interval. The output of "and" gate 601 is a series of negative pulses which are fed to one of the inputs of "or" gate 602. The other input to this "or" gate is obtained on line 420 from slow gate SG–1. The output of this "or" gate is similar to the waveform in FIG. 5(a) with 0.1 second reference pulses added at the beginnings of seconds which previously lacked them. The combined signal is fed to "and" gate 605. The other input to "and" gate 605 is derived from monostable multivibrator 603 which is triggered by 10 p.p.s. pulses from one-hundredth second counter CO–8. This multivibrator produces pulses with a duration of 40 msec. and supplies them to pulse shaper 604. This shaper amplifies and shapes the pulses transmitting them to the other input of "and" gate 605. The output of this "and" gate is of the type desired for the final delivery to the recorder. During the processing the pulses become somewhat irregular in amplitude and shape, therefore, they are sent to shaper 606 before being supplied to the recorder. The output from shaper 606 on line 610 is shown in FIG. 5(b).

If the specific recorder used accepts D.C. signals the output on line 610 may be amplified and sent directly to the recording mechanism controlling a marking pen, but if the recorder is designed to accept A.C. signals the output on line 610 may be sent to gate G–1 which is applied with an A.C. input. This gate is arranged to pass an A.C. signal to the recorder under the control of the D.C. signal from pulse generator PG–2.

Regardless of the specific recorder used the signal supplied thereto activates the recording mechanism in one channel of recorder 12 so that time is recorded by deflections of pen 10. Of course the time signals could be supplied to several recorders by using appropriate power amplification.

In conclusion, therefore, there has been disclosed an apparatus for recording time on a single track of a slow moving tape so that the resulting record can be easily and quickly read.

What is claimed is:

1. A time recording system for visibly recording time on a continuously moving record medium comprising:

means to produce a reference marker signal for each decimal digit representing time;

means to sequentially and selectively produce a plurality of binary value marker signals distributed in time at predetermined positions after said reference marker signal, the presence of a binary value marker signal indicating a value of one times $2^n$ and the absence of a binary value marker signal indicating a value of zero times $2^n$, where $n$ is a non-negative integer and has a value depending upon the time position of the binary value marker signal with respect to said reference marker signal; and means to visibly record said reference marker signals and said binary value marker signals on a single track of said continuously moving record medium.

2. The system of claim 1 wherein:

the recording means comprises a pen whose lateral motions with respect to the direction of motion of said record medium are indicative of the binary signals.

3. A time marking system for an elongated moving record medium comprising:

means for counting a series of uniformly recurring time pulses to sequentially and selectively produce a plurality of groups of binary value marker signals distributed in time at predetermined time positions, the presence of a binary value marker signal indicating a value of one times $2^n$ and the absence of a binary value marker signal indicating a value of zero times $2^n$, where $n$ is a non-negative integer and has a value depending upon the time position of the binary value marker signal, each group of binary value marker signals representing a binary-coded decimal digit and said plurality of groups representing time expressed in hours and fractions thereof;

marking means for visibly marking said record medium along a single track thereof; and means to apply said groups of binary value marker signals serially to said marking means to cause said marking means to move transversely to the motion of said record medium.

4. The time marking system of claim 3 wherein:

the marking means comprises a pen for marking a continuous trace along said record medium.

5. A system for serially recording binary-coded time signals comprising:

a continuously moving recording medium;

time pulse producing means;

coding means accepting signals from said pulse means to produce binary-coded decimal signals indicating units of time and fractions thereof, said binary-coded decimal signals comprising a plurality of reference marker signals and a plurality of groups of binary value marker signals distributed in time at predetermined positions after said reference marker signals;

gating means coupled to said coding means to serially gate said binary-coded decimal signals onto a single output line;

marking means connected to said single output line and including a pen for visibly marking a single continuous trace along said record medium to represent time in said binary-coded decimal digits.

6. A multichannel recording system for visibly recording a plurality of functions along a moving elongated record medium said system comprising:

a source of uniformly spaced timing pulses;

a series-connected cascaded counting chain to receive and count said pulses and produce binary-coded decimal signals on a plurality of output lines representing hours, minutes, seconds and fractions thereof, said binary-coded decimal signals comprising a plurality of reference marker signals and a plurality of groups of binary value marker signals, the presence of a binary value marker signal indicating a value of one times $2^n$ and the absence of a binary value marker signal indicating a value of zero times $2^n$, where $n$ is a non-negative integer;

gating means coupled to said output lines to serially transmit all of said binary-coded decimal signals on a single line;

a plurality of marking means for visibly recording said plurality of functions on said record medium, one of said marking means being connected to said single line to visibly record said binary-coded decimal signals as a series of deflections along a single channel of said elongated record medium.

7. The recording system of claim 6 wherein:
said gating means includes a plurality of fast gating means connected to said plurality of output lines to simultaneously pass a plurality of time series of binary signals representing the decimal digits and slow gating means connected to the outputs of the fast gating means to receive said plurality of time series in parallel and serially transmit them to said single line.

8. The recording system of claim 6 wherein: each of said marking means comprises a pen whose lateral movements in respect to the long axis of said elongated record medium represent the values of the function being recorded and wherein one of said pens records time in a serial fashion as a series of lateral deflections.

References Cited

UNITED STATES PATENTS

| | | | |
|---|---|---|---|
| 2,132,808 | 10/1938 | Sigo | 346—49 X |
| 3,237,171 | 2/1966 | Young | 340—172.5 |

RICHARD B. WILKINSON, *Primary Examiner.*

JOSEPH W. HARTARY, *Assistant Examiner.*